Dec. 12, 1972   H. M. PFLANZ   3,706,012
SERIES-PARALLEL ELECTRICAL CIRCUIT
Filed May 26, 1971

Inventor
Herbert M. Pflanz
By Robert C. Sullivan
Attorney

United States Patent Office 3,706,012
Patented Dec. 12, 1972

3,706,012
SERIES-PARALLEL ELECTRICAL CIRCUIT
Herbert M. Pflanz, Westwood, Mass., assignor to Allis-Chalmers Manufacturing Company, Milwaukee, Wis.
Filed May 26, 1971, Ser. No. 147,135
Int. Cl. H01h 47/10
U.S. Cl. 317—157                        11 Claims

ABSTRACT OF THE DISCLOSURE

An improved direct current electrical circuit in which any number of electrical devices may be energized in parallel with each other to momentarily provide a higher state of energization of the devices, or in which the devices may be energized in series with each other to provide a lower state of energization of the devices, with the circuit automatically reverting from the parallel energization state to the series energization state.

---

The invention is shown embodied in an improved trip coil circuit for a multi-pole electrical circuit breaker, such as a 3-pole circuit breaker, in which each pole of the circuit breaker is provided with its own separate trip coil, including capacitor means in circuit with each respective trip coil whereby to place each respective trip coil in parallel with the other trip coils across the direct current potential when the trip circuit is initially energized for tripping operation, the capacitor means being so arranged in the various trip coil circuits as to provide most efficient utilization of the capacitors, with equal effective capacitance being connected in series with each trip coil; and additional circuit means connecting the trip coils in series with each other across the direct current potential to provide an alternative current flow path for the trip coils when the capacitor means become substantially fully charged, and also to provide a series path through the trip coils whereby a supervisory signal device may monitor for trip circuit continuity prior to initiation of a tripping operation. The circuit thereby combines the advantages of the fast response time characteristic of a parallel circuit with the supervisory capability of a series circuit for monitoring circuit continuity of the plurality of trip coils.

BACKGROUND OF THE INVENTION

Field of the invention

This invention relates to an improved direct current electrical circuit in which any number of electrical devices may be energized in parallel with each other to momentarily provide a higher state of energization of the devices, or in which the electrical devices may be energized in series with each other to provide a lower state of energization of the devices, with the circuit automatically reverting from the parallel energization state to the series energization state.

In its broader sense the invention is applicable to circuits for the energization of electrical devices such as solenoids, relays, counters, etc., in which it is desired to energize any number of devices in parallel to momentarily provide a higher energization state of the devices, with the circuit automatically reverting to a series connection of the devices which provides a lower state of energization of the devices.

The invention is particularly applicable to the energization of the trip coil circuit of a multi-pole electrical circuit breaker, and will be described in this environment. However, it will be understood that the invention is not limited to the described embodiment.

Cross reference to related patent applications

The subject matter of the present application is an improvement on the subject matter of an application of Zygmunt A. Wachta entitled "Series-Parallel Electrical Circuit" filed concurrently with the present application.

Description of the prior art

In the prior art relating to trip coil circuitry for multi-pole circuit breakers, such as 3-pole circuit breakers, in which each pole of the circuit breaker is provided with its own separate trip coil, it has been known in the past to connect the plurality of trip coils either in a parallel circuit arrangement with respect to each other, or, alternatively, in a series circuit arrangement with respect to each other. The parallel connection of the plurality of trip coils has the advantage of fast response time. A disadvantage of the parallel connection of the trip coil circuits used in the prior art is the fact that it is not possible to have a single red indicating light or other suitable indicating means supervise the total trip circuit prior to initiation of the tripping operation whereby to indicate whether any one of the trip coils is open-circuited, since, with the parallel arrangement of the trip coils, if the circuit of one trip coil is open, the supervisory signal would still be connected to power through the other two parallel connected trip coils.

It is also known in the prior art instead of using the parallel connection of the trip coil circuits as hereinbefore described to connect the trip coils in series with each other. The series connection of the trip coils has the advantage that the supervisory signaling means such as a red indicating light may be connected in series with the series-connected trip coils to supervise or monitor the circuit continuity of all of the trip coils since if any one of the series-connected trip coils has an open circuit, the red light or other supervisory signal will be extinguished. However, the series connection of the trip coils as just described has the disadvantage that since the trip circuit coil inductance is tripled, being the sum of the inductances of the three individual trip coils, the tripping current through each trip coil builds up slowly, thereby causing the series connected trip circuit to have a slow response time.

SUMMARY OF THE INVENTION

Accordingly, it is an object of the present invention to provide an improved electrical circuit in which any number of electrical devices may be energized in parallel with each other to momentarily provide a higher state of energization of the devices, or in which the electrical devices may be energized in series with each other to provide a lower state of energization of the devices, and in which the circuit automatically reverts from the parallel energization state to the series energization state.

It is another object of the present invention to provide improved trip circuitry for a multi-pole circuit breaker in accordance with which the plurality of trip coils are arranged to be energized for tripping operation in parallel with each other and to be deenergized in series with each other.

It is a further object of the invention to provide improved circuitry for the trip coils of a multi-pole circuit breaker which combines the advantages of both parallel-connected trip coils of the prior art and of series-connected trip coils of the prior art.

It is a further object of the invention to provide improved trip coil circuitry for a multi-pole circuit breaker which has the advantage of fast tripping response time characteristic of parallel-connected trip coils, while permitting a signal light or other supervisory means to monitor the circuit continuity of the plurality of trip coils and their readiness to trip their respective breaker poles prior to actual initiation of the tripping operation.

In achievement of these objectives, there is provided in accordance with an embodiment of this invention a direct current electrical circuit in which any number of electrical devices may be energized in parallel with each other to momentarily provide a higher state of energization of the devices, or in which the electrical devices may be energized in series with each other to provide a lower state of energization of the devices, with the circuit automatically reverting from the parallel energization state to the series energization state.

In a specific embodiment of the invention, there is provided an improved trip coil circuit for a multi-pole electrical circuit breaker, such as a 3-pole circuit breaker, in which each pole of the circuit breaker is provided with its own separate trip coil, including capacitor means in circuit with each respective trip coil, whereby to place each respective trip coil in parallel with the other trip coils across the direct current potential when the trip circuit is initially energized for tripping operation, the capacitor means being so arranged in the various trip coil circuits as to provide most efficient utilization of the capacitors, with equal effective capacitance being connnected in series with each trip coil; and additional circuit means connecting the trip coils in series with each other across the direct current potential to provide an alternative current flow path for the trip coils when the capacitor means become fully charged, and also to provide a series path through the trip coils whereby a supervisory signal device may monitor for trip circuit continuity prior to initiation of a tripping operation. The circuit thereby combines the advantages of the fast response time characteristic of a parallel circuit with the supervisory capability of a series circuit for monitoring circuit continuity of the plurality of trip coils.

Further objects and advantages of the invention will become apparent from the following description taken in conjunction with the accompanying drawing in which:

BRIEF DESCRIPTION OF THE DRAWING

in FIG. 2 to simplify the circuit for purposes of clarity, various elements of the circuit of FIG. 1, such as the auxiliary switch contact, for example, have been omitted.

DESCRIPTION OF THE PREFERRED EMBODIMENT

Figure 1:
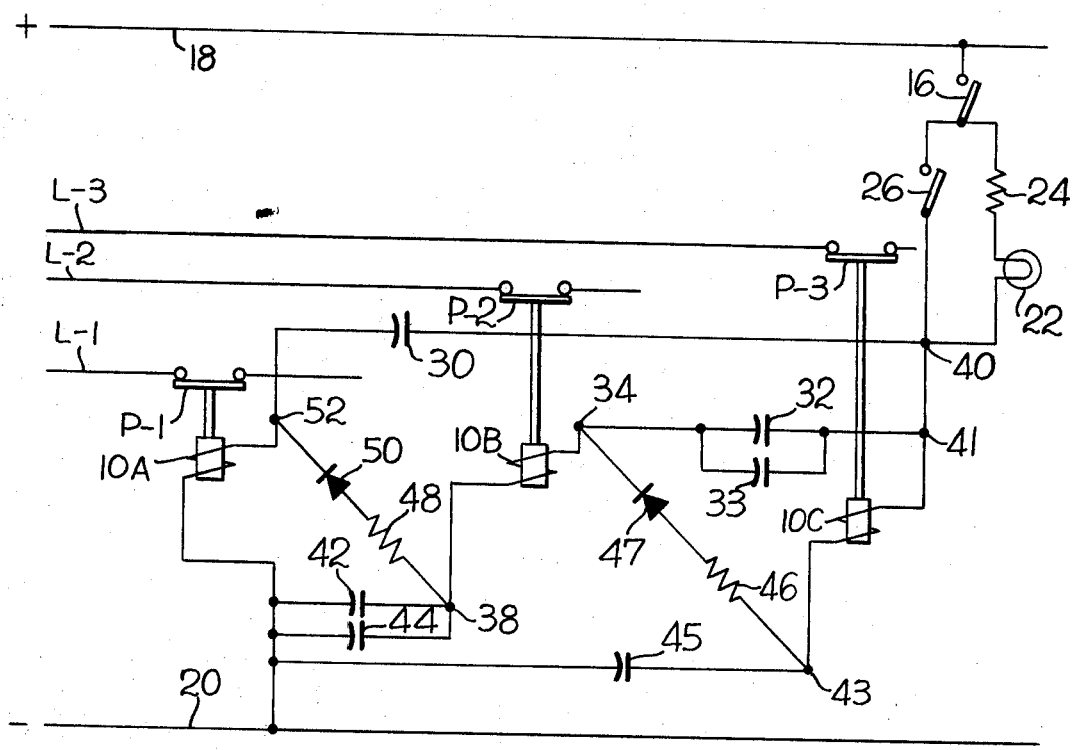
FIG. 1 is a circuit diagram of improved trip circuitry for a multi-pole circuit breaker such as a 3-pole circuit breaker in accordance with an embodiment of the invention.

Referring now to the circuit diagram of FIG. 1 which is for a 3-pole electrical circuit breaker having poles P–1, P–2 and P–3 in electrical lines L–1, L–2 and L–3, respectively, the trip coils for the respective poles of the 3-pole circuit breaker are indicated at 10A, 10B and 10C, respectively. Trip coils 10A, 10B and 10C when energized respectively cause tripping to open position of the respective breaker poles P–1, P–2 and P–3 as is well known in the art. The tripping circuit of the drawing is connected across lines 18 and 20 of a direct current power supply, such as 125 volts D.C.

Connected in series with the respective individual trip coils 10A, 10B and 10C is the normally closed breaker-operated auxiliary contact 16 which is closed when the breaker poles P–1, P–2, P–3 are closed. Contact 16 is operated to open position in the opening operation of the breaker.

When the breaker is closed, and before any actuation of the trip circuit has occurred, the supervisory signal device 22, which may be a red light, for example, is energized to indicate that the breaker is "ready" to trip—that is, that there is circuit continuity through each of the trip coils so that they will trip properly when the proper current pulse is supplied thereto, as will be hereinafter described. The supervisory signal device 22 is energized through the following series circuit: from the D.C. power supply positive line 18 through auxiliary contact 16 which is closed when the breaker is closed, through current limiting resistor 24, through supervisory signal device (red light) 22, to junction 41, through trip coil 10C, to junction 43, through resistance 46, through blocking diode 47 which is conductive in the direction of positive to negative, to junction 34, through trip coil 10B, to junction 38, through resistance 48 and blocking diode 50 which is conductive in the direction of positive to negative, to junction 52, through trip coil 10A, and thence to negative line 20 of the direct current power supply.

Thus, it will be seen that in the circuit of the drawing when the breaker is closed and prior to initiation of a tripping operation the supervisory signal device 22 is connected in series with all three trip coils 10A, 10B, 10C so that if any one of the trip coils has an open circuit and thus is inoperative, the red light or other supervisory signal 22 will be extinguished, giving a warning of the defective condition of the trip circuit. It will be obvious, of course, that the deenergization of the supervisory signal device 22 due to an open circuit in one of the trip coils could instead be utilized through suitable relay means (not shown) to cause the energization of an alarm circuit.

In the series circuit just described in which the supervisory signal device 22 is energized when the breaker is closed and prior to initiation of a tripping operation, due to the use of current limiting resistor 24 in series with supervisory signal device 22, and also due to the additional series resistance provided by resistors 46 and 48, the current through trip coils 10A, 10B and 10C is not enough to energize the trip coils sufficiently to cause them to trip their respective breaker poles to open position. Also, the values of the circuit constants, such as the resistance values of signal device 22 and of current limiting resistor 24 are such that any charging of the various capacitors in the circuitry to be described prior to the initiation of the tripping operation by closure of contact 26 is negligible and insignificant. The tripping circuit is energized to perform the tripping operation by closure of a normally open contact 26 which may be closed either manually or by a protective relay. During an actual tripping operation, closure of contact 26 shunts supervisory signal 22 and resistor 24, so that the red light 22 is extinguished during the actual tripping operation.

While the circuit of the supervisory signal device 22 has been shown and described as being energized only when the breaker is closed, with breaker-operated auxiliary contact 16 being closed, it is obvious that the circuit of supervisory signal 22 including current limiting resistor 24 could be connected directly to positive line 18 without going through breaker-operated auxiliary contact 16 so that the supervisory signal circuit would be energized by the direct current power source regardless of whether the breaker is open or closed. In this case, the supervisory signal 22 would monitor for trip coil circuit continuity when the breaker is open as well as when it is closed.

The parallel-series trip circuit can best be described in connection with its operation as follows:

When the contact 26 is closed to initiate tripping of the breaker, the three trip coils 10A, 10B and 10C are respectively initially energized by a current pulse (the charging pulse to the capacitor means in circuit with respective trip coils) in a respective one of three parallel paths, as follows:

(1) Trip coil 10A is initially energized by a current pulse in the following circuit path:

From the positive line 18 of the direct current power supply, through auxiliary contact 16, through contact 26 to junction 40, through capacitor 30 to junction 52 and to one side of trip coil 10A, through trip coil 10A, and thence to negative conductor 20 of the direct current power supply.

(2) Trip coil 10B is initially energized by a current pulse in the following circuit path:

From positive line 18 of the D.C. power supply, through auxiliary contact 16, through closed contact 26 to junction 41, through the parallel connected capacitors 32 and 33 to junction 34, thence through trip coil 10B to junction 38, and through the parallel connected capacitors 42 and 44 to the negative line 20 of the D.C. power supply.

(3) Trip coil 10C is initially energized by a current pulse in the following circuit path:

From positive line 18 of the D.C. power supply, through auxiliary contact 16, through closed contact 26, to junction 41 and one side of trip coil 10C, through trip coil 10C, to junction 43, thence through capacitor 45 to to the negative line 20 of the D.C. power supply.

Each of the six capacitors in the circuitry, namely capacitors 30, 32, 33, 42, 44 and 45, has the same capacitance value, for example, one microfarad, whereas for comparable circuit operational characteristics each of the six capacitors in the circuit disclosed in the aforesaid patent application of Zygmunt A. Wachta requires a capacitance of two microfarads. Thus, the circuit of the present application is more efficient than that of the aforesaid patent application of Zygmunt A. Wachta. Also, since the four capacitors 32, 33, 42, 44 in the circuit of trip coil 10B in the present application each individually have a capacitance of one microfarad, it can be shown that the equivalent combined capacitance of capacitors 32, 33, 42, 44 is one microfarad, due to the series connection in the circuit of trip coil 10B of the two parallel-connected capacitor pairs 32-33 and 42-44. Thus, each of the trip cells 10A, 10B, 10C has a capacitance of one microfarad in series therewith across the D.C. power supply lines 18 and 20, with the result that the circuit of each trip coil has an equal LC value, where L is the inductance of each trip coil 10A, 10B, 10C, and C is the capacitance in series with each respective trip coil.

At the moment of initial closure of contact 26, a momentary charging current to the respective capacitors in each of the parallel trip coil circuits just described passes through the respective trip coils 10A, 10B and 10C. This momentary charging current to the capacitors in each of the respective parallel circuits energizes the respective trip coils 10A, 10B and 10C sufficiently to trip each of the respective breaker poles P-1, P-2 and P-3 corresponding to the respective trip coils 10A, 10B and 10C, thereby providing a fast response time for tripping of the respective breaker poles.

After the initial rush of charging current which provides the pulse to the respective trip coils 10A, 10B and 10C sufficient to trip the breaker poles, as just explained, the various capacitors in the circuitry just described, namely, capacitors 30, 32, 33, 42, 44 and 45, become substantially completely charged and therefore nonconducting to further flow of direct current in the parallel paths just enumerated. When the capacitors in the circuitry become nonconducting to further flow of direct current, the current then must flow through the three trip coils 10A, 10B and 10C in only the following series path:

From the D.C. power supply positive line 18 through closed auxiliary contact 16 which is about to open but which has not yet opened, through contact 26, to junction 41, through trip coil 10C, to junction 43, through resistance 46, through blocking diode 47 which is conductive in the direction of positive to negative, to junction 34, through trip coil 10B, to junction 38, through resistance 48 and blocking diode 50 which is conductive in the direction of positive to negative, to junction 52, through trip coil 10A, and thence to negative line 20 of the direct current power supply.

The use of blocking diode 47 in series with resistor 46 and of the blocking diode 50 in series with the resistor 48 are refinements which are not fundamental to the operation of the circuit but are for the purpose of preventing wasted current flow through the resistors 46 and 48 during the initial energization period when the capacitors are charging after closure of contact 26 when the resistors 46 and 48 are electrically in parallel with the trip coils.

During the later phase of the breaker opening operation, when the current flow to the trip coils 10A, 10B and 10C follows the series path in which the trip coils are connected in series, the current flow through the series-connected trip coils is reduced due to the fact that the inductances of the three trip coils 10A, 10B and 10C are connected in series with each other. This results in a reduced flow of current in the series circuit of the trip coils 10A, 10B and 10C, resulting in smaller shut-off current when the breaker operated auxiliary contact 16 is opened during the final phase of the opening movement of the breaker. This reduced current in the series circuit just described minimizes arcing at the auxiliary contact 16.

The capacitance of the capacitors in the circuits of the trip coils are so related to the time required for the auxiliary contact 16 to open that the capacitors have become fully charged and nonconductive to further direct current flow before the auxiliary contact has opened. Therefore, during the later phase of the opening operation of the breaker and of the auxiliary contact, the trip coils are connected across the direct current potential in series with each other, resulting in a smaller shut-off current in the trip circuit during the final phase of the breaker opening operation, which minimizes arcing at the auxiliary contact, as previously mentioned.

After the circuit breaker has opened, with the resulting opening of the breaker operated auxiliary contact 16, the entire tripping circuit is then disconnected from the positive bus 18 so that the charged capacitors in the circuit such as capacitors 30, 32, 33, 42, 44 and 45 may then discharge in preparation for a subsequent tripping operation. For example, the capacitors 32 and 33 would discharge in a localized circuit from the right-hand side of capacitors 32, 33, as shown in FIG. 1, to junction 41, through trip coil 10C to junction 43, through resistance 46 and blocking diode 47 to junction 34, and thence back to the opposite side or left-hand side with respect to the view shown in FIG. 1 of the capacitors 32 and 33. The other capacitors of the circuitry would discharge in a similar manner through corresponding localized circuits.

Figure 3:
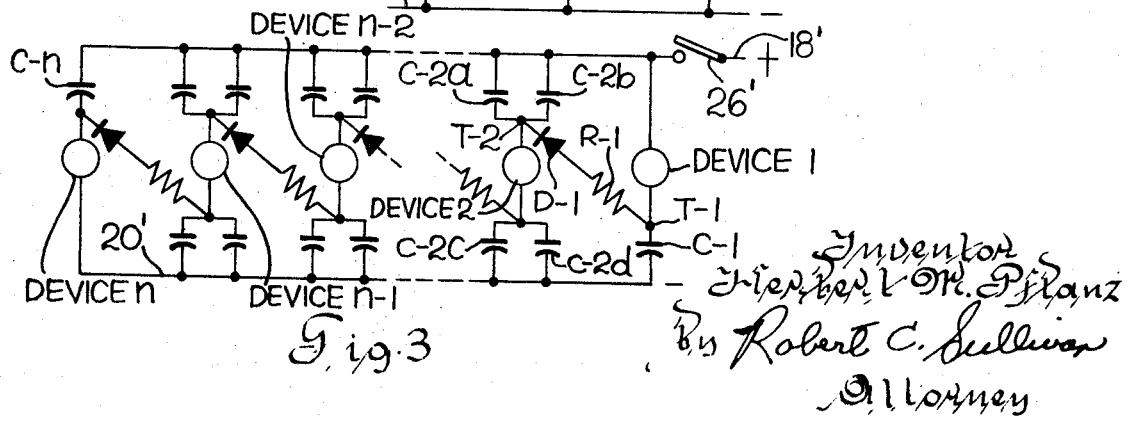
FIG. 3 is a schematic diagram of the circuit of the invention for the momentary energization of $n$ devices in parallel in accordance with the invention.

There is shown in FIG. 3 a schematic circuit arrangement of a multiplicity of devices which may be energized in parallel with each other to momentarily provide a higher state of energization of the devices or in which the devices may be energized in series with each other to provide a lower state of energization of the devices, with the circuit automatically reverting from the parallel or higher energization state to the series or lower energization state.

Referring now to FIG. 3, there are shown a plurality of devices numbered from 1 to n, inclusive, connected across the direct current power supply lines 18' and 20'. Devices 1 to n, inclusive, may be any type of electrical devices such as solenoids, relays, counters, etc., requiring a momentary pulse of current therethrough to provide a higher state of energization, followed by a lower rate of current flow therethrough to provide a lower state of energization. The details of the circuit and its operation will not be described since the circuit and its operation are essentially the same as that shown in FIGS. 1 and 2, and merely has a greater number of devices than the circuit of FIGS. 1 and 2. However, it may be pointed out that device No. 1 has one terminal thereof connected to the power line 18', through switch 26', and the other terminal of device No. 1 is connected to the opposite power line 20' in series with a capacitor C–1.

A first pair of parallel-connected capacitors C–2a and C–2b are connected at one of their ends to D.C. power line 18' through switch 26' and at the other of their ends to one terminal of device No. 2, while a second pair of parallel-connected capacitors C–2c and C–2d are connected at one of their ends to the opposite terminal of device No. 2, the opposite ends of capacitors C–2c and C–2d being connected to the negative side 20' of the direct current power supply.

A resistor R–1 and a blocking diode D–1 which is conductive from positive to negative are connected in series between junction T–1 and T–2. Junction T–1 is located on the conductor which connects device No. 1 to capacitor C–1. Junction T–2 is located on the conductor which connects capacitors C–2a, C–2b to device No. 2.

All of the devices from device No. 3 through device No. $n$ minus 1 ($n$–1) are connected across the power lines 18' and 20' in a manner similar to that described in connection with device No. 2; that is, each of devices No. 3 through No. $n$ minus 1 has two parallel connected capacitors such as C–2a and C–2b between power line 18' and one terminal of the respective device and another pair of parallel connected capacitors such as C–2c and C–2d connected between the other terminal of the respective device and the opposite power line 20' in the same manner as shown in connection with device No. 2. The last device, namely device No. $n$, has a single capacitor C–$n$ connected between the power line 18' and one terminal of the device No. $n$, while the other terminal of device No. $n$ is connected to negative power line 20'. Each of the capacitors shown in the diagram of FIG. 3, has the same capacitance such as one microfarad, for example.

The parallel circuit path of each device is connected to the parallel circuit path of the next successive device by a resistance such as R–1 connected in series with a blocking diode such as D–1 in a manner similar to that described in connection with devices No. 1 and No. 2 whereby to establish a series energization path for all of the devices when the capacitors become charged.

Figure 2:
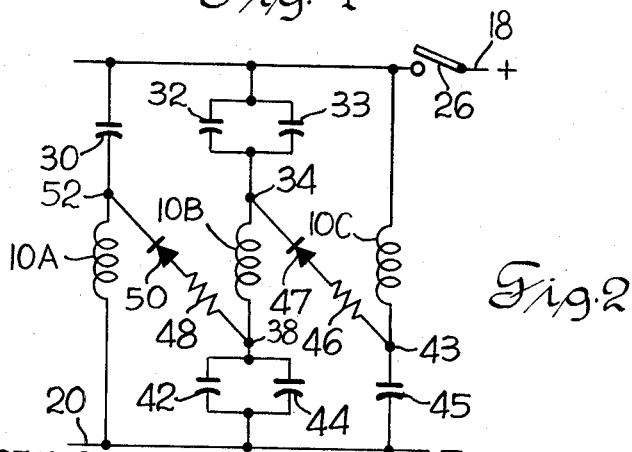
FIG. 2 is a schematic diagram of the circuit of FIG. 1 to illustrate the basic connections of the circuit of FIG. 1.

As explained in the previous discussion in connection wtih FIGS. 1 and 2, due to the arrangement of the capacitors and the fact that each capacitor in the circuit of FIG. 3 has the same capacitance value, each device 1 through $n$ is connected in its respective parallel circuit path in series with a capacitance of the same capacitance value across the D.C. power lines 18' and 20'. The parallel circuit paths containing the capacitors connect the plurality of devices in parallel with each other to momentarily provide a higher state of energization of the devices when the capacitors are charging. As described in the embodiments in FIGS. 1 and 2, the parallel energization circuit automatically reverts to a series energization circuit of the devices through the series path defined by the resistors such as R–1 and the blocking diodes such as D–1 to provide a lower state of energization of the devices after the capacitors have become charged.

It can be seen from the foregoing that there is provided in accordance with FIGS. 1 and 2, an embodiment of the invention which provides an improved circuit arrangement for the energization of the trip coils of a multi-pole circuit breaker in accordance with which the trip coils are effectively connected in parallel with each other during the initial phase of the breaker opening operation, thereby providing a fast response time of the trip coils which provides fast tripping of the circuit breaker, the capacitor means being so arranged in the various trip coil circuits so as to provide most efficient utilization of the capacitors, with equal effective capacitance being connected in series with each trip coil; and with the plurality of trip coils being effectively connected in series with each other during the later phase of the breaker opening operation, whereby to provide a lower current through the series connected trip coils when they are being deenergized, which minimizes arcing at the auxiliary contact 16 during the opening of the breaker-operated auxiliary contact. Furthermore, the series connection of the trip coils in the circuitry arrangement permits the red light or other supervisory signal to be connected in series with the plurality of trip coils whereby to provide an indication prior to initiation of the tripping operation of whether or not there is a continuous circuit through the trip coils, as an indication of a possible open circuit condition in any one of the trip coils.

While in the specific embodiments of FIGS. 1 and 2 described hereinbefore, the control circuit has been shown controlling the tripping operation of each pole of a single multi-pole breaker, it is obvious that a circuit of the type shown may be used to control the opening of each pole of two or more multi-pole breakers when simultaneous opening of a plurality of multi-pole breakers is desired.

It is apparent that in its broader sense the invention is applicable to circuits for energizing any number of electrical devices such as solenoids, relays, counters, etc., in which it is desired to energize a multiplicity of such devices in parallel to momentarily provide a higher state of energization of the devices, with the circuit automatically reverting to a series connection of the devices which provides a lower state of energization of the devices.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A direct current electrical energization circuit for $n$ electrical devices, comprising a corresponding first circuit path for each of said devices including capacitor means in series with each respective device, each of said first circuit paths being adapted to be connected across the opposite lines of a direct current power supply when said circuit is energized whereby to place said plurality of devices in parallel current flow relation to each other in series with their corresponding capacitor means to thus supply a current pulse to each respective device when said capacitor means are charging upon initial energization of said circuit, the first of said $n$ devices being adapted in its respective first circuit path to have one terminal thereof connected to one line of said power supply and to have the other terminal thereof connected in series with a single capacitor to the other line of said power supply; each of said devices from the second of said devices through the ($n$–1) of said devices being adapted in its respective first circuit path to have one terminal thereof connected to said one line of said power supply in series with a pair of parallel-connected capacitors and to have the other terminal thereof connected to the other line of said power supply in series with another pair of parallel-connected capacitors; the $n$th of said devices in its respective first circuit path having one terminal thereof connected to said one line of said power supply in series with a single capacitor and having the other terminal thereof connected to said other line of said power supply; each of said capacitors having substantially equal capacitance value; said capacitor means becoming substantially nonconductive to further flow of direct current in the respective first circuit paths upon becoming substantially fully charged; and a resistance-containing circuit path connecting a terminal of each of said devices to a terminal of the next successive of said devices whereby to place all of said devices in series with each other in a circuit path excluding said capacitor means and thereby provide an alternative current flow path for said devices when said capacitor means become substantially fully charged.

2. A direct current electrical energization circuit as defined in claim 1 in which said electrical devices are the trip coils of a multi-pole electrical circuit breaker.

3. A trip coil circuit for a 3-pole circuit breaker of the type having a separate trip coil operatively associated with each pole for tripping the respective pole to an open position upon energization of the corresponding trip coil, a series circuit path in which the three trip coils associated with the three poles of said circuit breaker are adapted to be connected in series relation with each other across the opposite lines of a direct current power supply, said series circuit path having a first one of said trip coils adapted to have one end thereof connected to one line of said power supply, the opposite end of said first one of said trip coils being connected at a first junction to one end of a first resistor-containing path, the opposite end of said first resistor-containing path being connected at a second junction to one end of a second one of said trip coils, the opposite end of said second one of said trip coils being connected at a third junction to one end of a second resistor-containing path, the opposite end of said second resistor-containing path being connected at a fourth junction to one end of a third one of said trip coils, the opposite end of said third one of said trip coils being adapted to be connected to the other line of said power supply, and additional circuit means adapted to place said trip coils in parallel paths with each other upon initiation of a tripping operation, comprising a first capacitor connected between said first junction and said other line of said power supply, second and third capacitors connected in parallel with each other between said second junction and said one line of said power supply, fourth and fifth capacitors connected in parallel with each other between said third junction and said other line of said power supply, and a sixth capacitor connected between said fourth junction and said one line of said power supply, all of said capacitors being of substantially equal capacitance value.

4. A trip coil circuit as defined in claim 3 comprising a supervisory signal means connected in circuit with all of the series-connected trip coils whereby to monitor the circuit continuity of all of said trip coils.

5. A trip coil circuit as defined in claim 3 in which each of said resistor-containing paths includes means permitting flow of current through the respective path in only one direction.

6. A trip coil circuit as defined in claim 3 in which said capacitors become nonconductive to further flow of direct current in the respective said parallel paths upon becoming substantially fully charged.

7. In combination, a 3-pole electrical circuit breaker having a separate trip coil operatively associated with each pole for tripping the respective pole to an open position upon energization of the corresponding trip coil, an energization circuit for said trip coils, said circuit comprising a series circuit path in which the three trip coils associated with the 3 poles of said circuit breaker are adapted to be connected in series relation with each other across the opposite lines of a direct current power supply, said series circuit path having a first one of said trip coils adapted to have one end thereby connected to one line of said power supply, the opposite end of said first one of said trip coils being connected at a first junction to one end of a first resistor-containing path, the opposite end of said first resistor-containing path being connected at a second junction to one end of a second one of said trip coils, the opposite end of said second one of said trip coils being connected at a third junction to one end of a second resistor-containing path, the opposite end of said second resistor-containing path being connected at a fourth junction to one end of a third one of said trip coils, the opposite end of said third one of said trip coils being adapted to be connected to the other line of said power supply, and additional circuit means adapted to place said trip coils in parallel paths upon initiation of a tripping operation, comprising a first capacitor connected between said first junction and said other line of said power supply, second and third capacitors connected in parallel with each other between said second junction and said one line of said power supply, fourth and fifth capacitors connected in parallel with each other between said third junction and said other line of said power supply, and a sixth capacitor connected between said fourth junction and said one line of said power supply, all of said capacitors being of substantially equal capacitance value.

8. The combination defined in claim 7 comprising a supervisory signal means connected in series with all of the series-connected trip coils whereby to monitor the circuit continuity of all of said trip coils.

9. The combination defined in claim 7 in which each of said resistor-containing paths includes means permitting flow of current through the respective path in only one direction.

10. The combination defined in claim 7 in which said capacitors become substantially nonconductive to further flow of direct current in the respective said parallel paths upon becoming substantially fully charged.

11. A direct current electrical energization circuit for $n$ trip coils of a multi-pole electrical circuit breaker comprising a separate first circuit path for each of said trip coils including capacitor means in circuit with each respective trip coil, each of said first circuit paths being adapted to be connected across the opposite lines of a direct current power supply, the first of said $n$ trip coils being adapted in its respective first circuit path to have one terminal thereof connected to one line of said power supply and to have the other terminal thereof connected in series with a single capacitor to the other line of said power supply; each of said trip coils from the second of said trip coils through the $(n-1)$ of said trip coils being adapted in its respective first circuit path to have one terminal thereof connected to said one line of said power supply in series with a pair of parallel-connected capacitors and to have the other terminal thereof connected to the other line of said power supply in series with another pair of parallel-connected capacitors; the $n$th of said trip coils in its respective first circuit path having one terminal thereof connected to said one line of said power supply in series with a single capacitor and having the other terminal thereof connected to said other line of said power supply; each of said capacitors having substantially equal capacitance value; said capacitors becoming substantially nonconductive to further flow of direct current in the respective first circuit paths upon becoming substantially fully charged; and a resistance-containing circuit path connecting a terminal of each of said trip coils to a terminal of the next successive of said trip coils whereby to place all of said trip coils in series with each other in a circuit path excluding said capacitor means and thereby provide an alternative current flow path for said trip coils when said capacitor means become substantially fully charged.

References Cited
UNITED STATES PATENTS

| | | | |
|---|---|---|---|
| 2,221,573 | 11/1940 | Bruckmann | 307—110 X |
| 3,229,124 | 1/1966 | Schofield | 307—110 |
| 3,496,378 | 2/1970 | Sakamoto | 307—110 |
| 3,043,990 | 7/1962 | Lillquist | 307—37 X |

ROBERT K. SCHAEFER, Primary Examiner

W. J. SMITH, Assistant Examiner

U.S. Cl. X.R.

317—137